3,198,853
COMPOSITION RESISTANT TO STRESS-CRACKING IN SOLVENTS COMPRISING GRAFT COPOLYMER-RESIN BLEND CONTAINING DIAMINE
Robert L. Bergen, Jr., Cheshire, Conn., assignor to United States Rubber Company, New York, N.Y., a corporation of New Jersey
No Drawing. Filed May 23, 1962, Ser. No. 196,878
8 Claims. (Cl. 260—876)

This invention relates to a composition comprising a graft copolymer of styrene and acrylonitrile on polybutadiene, containing p,p'-diaminodiphenylmethane or an aliphatic diamine, which composition is characterized by remarkable resistance to stress cracking.

Compositions comprising graft copolymers of styrene and acrylonitrile on polybutadiene are useful in making shaped articles of various sorts by such processes as molding, extruding and calendering. Under ordinary conditions the articles made from such graft copolymer compositions are resistant to organic solvent liquids such as isopropyl alcohol and n-hexane. Unfortunately, however, if the article is subjected to stress, whether thermal or mechanical, the article will tend to crack in the presence of these liquids. This places a serious limitation on the usefulness of the graft copolymer composition in such applications as pipe or containers for these liquids.

I have now found, unexpectedly, that if a small amount of p,p'-diaminodiphenylmethane or an aliphatic diamine is mixed in with the graft copolymer of styrene and acrylonitrile on polybutadiene, the composition most surprisingly becomes highly resistant to cracking in solvent liquids even when under stress. This remarkable discovery enables one to take advantage of the high impact strength and other good physical and chemical properties of the graft copolymer in making pipe, containers, and other articles for use in contact with solvent liquids under conditions of thermal or mechanical stress.

I am aware of U.S. Patent 2,811,504, issued to Peterson et al. on October 29, 1957, which discloses compositions comprising hexamethylenediamine, ethylenediamine, or other alkylene polyamines in blends of styrene-acrylonitrile resin with butadiene-acrylonitrile rubber. I am also aware of U.S. Patent 2,838,471, issued to Peterson et al. on June 10, 1958, which discloses compositions comprising p,p'-diaminodiphenylmethane or other aromatic polyamines in blends of styrene-acrylonitrile resin with butadiene-acrylonitrile rubber.

However, the styrene-acrylonitrile resin-butadiene-acrylonitrile rubber blends used in the Peterson et al. disclosure do not become resistant to stress cracking in solvents when an alkylene polyamine such as hexamethylenediamine or ethtylenediamine, or an aromatic polyamine such as p,p'-diaminodiphenylmethane, is added to the blend. Therefore it was most unexpected to find that the presently specified graft copolymer of styrene and acrylonitrile on polybutadiene becomes highly resistant to stress cracking in solvents when one of the presently specified diamines is added to the graft copolymer.

Furthermore, the presently specified graft copolymer of styrene and acrylonitrile on polybutadiene is not subject to surface crazing, unlike the styrene-acrylonitrile resin/butadiene-acrylonitrile rubber blend used by Peterson et al. Therefore there would be no reason for a person skilled in the art to add the presently specified diamines to the presently specified graft copolymer.

It is desired to emphasize that the phenomena of surface crazing and stress cracking are distinctly different. The former occurs as a whitish haze with no cracks being visible even under the highest power light microscope. The occurrence of surface crazing also does not depend upon whether or not the sample is under stress and is considered to be caused by the oxygen or ozone or some other chemical normally present in our atmosphere. On the other hand when stress cracking occurs, the cracks are visible to the naked eye. This phenomenon occurs only when the sample is under stress and even when the sample is under stress no cracking occurs in air. These observations, then, would indicate that stress cracking and "surface crazing" as defined by the Peterson et al. patents referred to above are entirely different phenomena. This is confirmed by the fact that various chemicals disclosed as effective by Peterson et al., including p-phenylenediamine and benzidine dihydrochloride, do not improve the stress cracking resistance of the present graft copolymer compositions.

I am aware that polyamines have previously been added to rubbers for such purposes as preventing bloom in the *vulcanized* rubber or as antioxidants in the *vulcanized* rubber but bloom-formation in vulcanized rubber and deterioration by oxidation in vulcanized rubber are problems entirely foreign to the problem of stress cracking in solvents of the *unvulcanized, thermoplastic* composition involved in the present invention.

The graft copolymers employed in the invention may be prepared, for example, as described in U.S. Patent 2,820,773, issued to Childers and Fisk on January 21, 1958, by first preparing a polybutadiene rubber latex, and then adding styrene and acrylonitrile monomers to the latex, and subjecting the mixture to polymerizing conditions, whereby the styrene and acrylonitrile resin-forming monomers become "graft polymerized" on the polybutadine rubber spine, thus producing a material which partakes of the nature of a resin as well as a rubber. The graft copolymer may be described as containing from 25 to 95%, by weight of resin (styrene plus acrylonitrile) and correspondingly from 75 to 5% by weight of rubber (polybutadiene). The styrene-acrylonitrile portion in turn is composed of from 65 to 90% by weight of styrene and correspondingly from 35 to 10% by weight of acrylonitrile. In a preferred form of the invention such graft copolymer is blended with a separately prepared resinous copolymer of styrene or alpha-methyl styrene and acrylonitrile. The amount of styrene or alpha-methyl styrene in such separately prepared copolymer resin is usually from 65 to 95% by weight, while the amount of acrylonitrile is correspondingly from 35 to 5% by weight. Up to 75% by weight of such separately prepared copolymer resin may be blended with correspondingly 25% by weight or more of the graft copolymer. The graft copolymer and the separately prepared resinous copolymer may be prepared in any desired conventional manner, and they may be blended in any appropriate fashion, such as by latex blending the graft copolymer latex and the resinous copolymer latex, coprecipitating and drying, or by mill blending the dry graft copolymer and resinous copolymer.

The invention involves adding to the graft copolymer of styrene and acrylonitrile on polybutadiene rubber, with or without separately prepared resinous copolymer of styrene or alpha-methyl styrene and acrylonitrile, a small but effective amount of p,p'-diaminodiphenylmethane or an aliphatic diamine containing from 2 to 6 carbon atoms. Alkylene diamines or polymethylene diamines having 2 to 6 carbon atoms are especially suitable aliphatic diamines. I have found that the resistance of the described graft copolymer, or its mixture with the described separately prepared resinous copolymer, to stress cracking in such chemicals as isopropyl alcohol or n-hexane can be remarkably increased by the addition of, for example, from 0.1 part or less to 2 parts or more, based on 100 parts by weight of the copolymers, of the described diamine. A preferable ratio is from 0.25 to 0.75 part by weight of the diamine, and the preferred composition is that containing p,p'-diaminodiphenylmethane. As an additional advantage these diamines have been found to improve the hot processing of these blends in that molded and extruded parts have less thermal stress. The specified diamines can be added to the copolymer composition at any stage during the mixing or milling process. Of course, other desired appropriate ingredients, such as pigments, or fillers including carbon black may be included in the composition in the conventional manner.

The compositions of the invention are particularly useful for producing rigid thermoplastic pipe. The thermal stresses in plastic pipe may be qualitatively determined by cutting a ring from a section of pipe and placing that ring in glacial acetic acid for two minutes. Badly stressed rings will fall apart under these conditions while rings which are not cracked in this test are judged to be indicative of good quality pipe suitable for pressure service.

The composition may also be tested for susceptibility to stress cracking by compression molding a thin sheet of the material, and annealing it by very slow cooling from the molding temperature (350–400° F.) to room temperature to remove all thermal stress. As is disclosed in more detail in an article by E. E. Ziegler, SPE Journal, 10, No. 4, 12 (April 1954), stress cracking may be measured by deforming the molded samples of the material free of thermal stress on a jig of known radius of curvature. Thus, strips one inch wide by about four inches long may be cut from the molded, annealed sheet, which may be from 0.02 to 0.04 inch thick. These strips are then bent around a stainless steel jig which is machined as a quarter section of an ellipse having a semimajor axis of 5 inches and a semi-minor axis of 1.5 inches. These strips are held to the jig along their entire length by metal bands. This assembly is then completely immersed in the chemical for sixteen hours. It has been found that no further cracking will occur with increased exposure times. At the end of the test period the radius of curvature, $r$, at the point where cracking stops is determined. Also, the thickness, $t$, of the sample at this point is measured. These two quantities plus the measured flexural modulus, $E$, of the sample then yield the critical stress, $S_c$, for the sample in that particular chemical: $S_c = Et/2r$. Due to difficulties in determining the exact point at which cracking stops there is some scatter in the calculated $S_c$ values. A statistical analysis of the data from many tests gave a standard deviation of 170 p.s.i. for these measurements.

It will be understood that any material which is deformed or caused to flow in the melted (or less viscous) state, for example in making an extruded piece, and then is suddenly cooled or quenched will have strains set up in the piece. This is due to the fact that the surface cools and sets in a strained state before the interior of the piece. This effect is well known in metals and glass as well as in plastics. In order to produce a part with low thermal stress the part should be cooled slowly or annealed. We have found experimentally that, if conventional graft polymers are extruded as pipe and passed directly from the hot extruder (stock temperatures as high as 450 to 500° F.) into a cold water bath, the resulting pipe is extremely brittle and generally unsuited for use. Therefore it has been necessary in conventional practice to cool the pipe more slowly by using hot (200° F.) water, otherwise the pipe is brittle and will not perform satisfactorily when carrying liquids under pressure for long periods of time. In contrast, the compositions of the invention can be cooled more rapidly by using colder water or larger volumes of water and still produce acceptable pipe as described above and as measured by the glacial acetic acid test. This fact is important since it makes it easier to produce pipe that is perfectly round and within dimensional tolerances.

The following examples, in which all quantities are expressed by weight, will serve to illustrate the practice of the invention in more detail.

Example 1

The results given below show the improvement in stress cracking resistance made possible by the invention. In this example the composition employed contained a graft copolymer of 50 parts of styrene and acrylonitrile (ratio 70/30) on 50 parts of polybutadiene rubber. 35 parts of this graft copolymer were blended with 65 parts of a separately prepared resinous copolymer of alpha-methyl styrene and acrylonitrile (ratio 69/31). The test chemicals shown in the following table were each present in amount of 0.5 part by weight per 100 parts of total polymers.

| Chemical | No. of Samples Tested | Average $S_c$ in isopropyl alcohol (p.s.i.) | Average $S_c$ in n-hexane (p.s.i.) |
|---|---|---|---|
| None | 6 | 1,600 | 2,500 |
| p,p'-Diaminodiphenylmethane | 4 | 2,000 | (¹) |
| Hexamethylenediamine | 2 | 2,000 | (¹) |
| Ethylenediamine | 3 | 1,850 | |
| Triethylene tetramine | 2 | 1,600 | |
| 4,4'-Diaminodiphenylamine | 2 | 1,500 | 2,440 |

¹ No cracks observed ($S_c$ greater than 10,000 p.s.i.).

These results show that p,p'-diaminodiphenylmethane, hexamethylenediamine and ethylenediamine improve the stress cracking resistance of this composition significantly while triethylene tetramine and 4,4'-diaminodiphenylamine have no significant effect on this composition. In addition, it was found that the former compositions showed superior processing characteristics and resulted in products with lower thermal stress as measured by the glacial acetic acid test on pipe rings.

Example 2

The results given below show the improvement in stress cracking resistance of a composition comprising 55 parts of the graft copolymer described in Example 1, plus 45 parts of a separately prepared resinous copolymer of styrene and acrylonitrile (ratio 70/30). In other words, the plastic composition in this example was essentially the same as that in Example 1, except that the separately prepared copolymer resin in this example was based on styrene, instead of alpha-methyl styrene as in Example 1. The test chemicals were present in amount of 0.5 part by weight per 100 part of total polymers.

| Chemical | No. of samples Tested | Average $S_c$ in isopropyl alcohol (p.s.i.) |
|---|---|---|
| None | 6 | 1,200 |
| p,p'-Diaminodiphenylmethane | 2 | 1,750 |
| Hexamethylenediamine | 2 | 1,500 |

These results show that the chemicals improve the stress cracking resistance of this composition significantly. In addition the latter two compositions showed superior processing characteristics as measured by the glacial acetic acid test on pipe rings.

Having thus described my invention, what I claim and desire to protect by Letters Patent is:

1. A thermoplastic composition comprising
   A. 0.1 to 2 parts by weight of an organic diamine selected from the group consisting of p,p'-diaminodiphenylmethane and aliphatic diamines having from 2 to 6 carbon atoms, and
   B. 100 parts by weight of a thermoplastic blend comprising
      (a) at least 25 parts of a graft copolymer, and
      (b) correspondingly not more than 75 parts of a separately prepared resinous copolymer, the said graft copolymer being a graft copolymer of
C. from 25 to 95 parts by weight of styrene and acrylonitrile, the weight ratio of styrene:acrylonitrile being from 65:35 to 90:10, on correspondingly
D. from 75 to 5 parts by weight of polybutadiene rubber, and the said separately prepared resinous copolymer being a copolymer of
E. from 65 to 90 parts by weight of a monomer selected from the group consisting of styrene and alpha-methyl styrene, and correspondingly
F. from 35 to 10 parts by weight of acrylonitrile, the said blend (B) being ordinary subject to cracking when immersed in organic solvent liquids under stress, but the said organic diamine (A) serving to improve the resistance of the composition to such cracking.

2. A composition as in claim 1 in which the amount of said organic diamine is from 0.25 to 0.75 part by weight.

3. A composition as in claim 1 in which the organic diamine is p,p'-diaminodiphenylmethane.

4. A composition as in claim 2 in which the organic diamine is p,p'-diaminodiphenylmethane.

5. A composition as in claim 1 in which the organic diamine is ethylene diamine.

6. A composition as in claim 2 in which the organic diamine is ethylene diamine.

7. A composition as in claim 1 in which the organic diamine is hexamethylenediamine.

8. A composition as in claim 2 in which the organic diamine is hexamethylenediamine.

References Cited by the Examiner

UNITED STATES PATENTS

| | | | |
|---|---|---|---|
| 2,811,504 | 10/57 | Peterson et al. | 260—41 |
| 2,838,471 | 6/58 | Peterson et al. | 260—45.9 |
| 2,902,466 | 9/59 | Rosenwald et al. | 260—45.9 |
| 3,010,936 | 11/61 | Irvin | 260—45.5 |
| 3,113,124 | 12/63 | Popoff et al. | 260—45.9 |

MURRAY TILLMAN, *Primary Examiner.*

JAMES E. SEIDLECK, *Examiner.*